US005573093A

United States Patent [19]
Lee

[11] Patent Number: 5,573,093
[45] Date of Patent: Nov. 12, 1996

[54] RATCHET TRANSMISSION CONTROL MECHANISM OF A SCREWDRIVER

[76] Inventor: Song M. Lee, P.O. Box 82-144, Taipei City, Taiwan

[21] Appl. No.: 540,584

[22] Filed: Oct. 6, 1995

[51] Int. Cl.[6] ............................. B25B 15/04; F16D 41/18
[52] U.S. Cl. ............................. 192/43.2; 192/46; 192/47; 81/63.1
[58] Field of Search ............................. 192/43, 43.2, 46, 192/47; 81/58, 60, 63.1

[56] References Cited

U.S. PATENT DOCUMENTS

| 2,395,681 | 2/1946 | Odlum et al. | 192/43.2 |
| 2,565,961 | 8/1951 | Godfrey | 192/43 |
| 2,649,176 | 8/1953 | Winger | 192/43 |
| 4,735,120 | 4/1988 | Beugelsdyk | 81/63.1 |

FOREIGN PATENT DOCUMENTS

| 2513648 | 9/1976 | Germany | 81/60 |

Primary Examiner—Richard M. Lorence
Attorney, Agent, or Firm—Alfred Lei

[57] ABSTRACT

A ratchet transmission control mechanism which includes a casing having a head at one end, toothed shaft inserted into an axial center hole on the head to hold a bit for turning screws, two stop blocks mounted in a respective slot on the head of the casing and retained in place by a clamp for engagement with the toothed portion of the toothed shaft, an adjusting cap mounted around the toothed shaft over the head of the casing and retained in place by a locating ring, whereby when the adjusting cap is turned to the middle position, the two stop blocks are forced into engagement with the toothed portion of the shaft, for permitting the shaft to be turned by the casing in both ways; when the adjusting cap is turned to the leftward position or the rightward position, only one stop block is forced into engagement with the toothed portion of the shaft, and the shaft can only be turned by the casing in one direction.

3 Claims, 3 Drawing Sheets

5,573,093

RATCHET TRANSMISSION CONTROL MECHANISM OF A SCREWDRIVER

BACKGROUND OF THE INVENTION

The present invention relates to reversible screwdrivers, and relates more particularly to the ratchet transmission control mechanism of a screwdriver.

Various reversible screwdrivers are well known, and popularly accepted. These reversible screwdrivers commonly use a ratchet mechanism and a switch for controlling the transmission of driving power from the handle to the shaft. When the switch is shifted leftwards, the first stop plate of the ratchet mechanism is forced into engagement with the ratchet on the shaft, and the second stop plate thereof is forced away from the ratchet, therefore the shaft can be turned by the handle clockwise. When the switch is shifted rightwards, the second stop plate of the ratchet mechanism is forced into engagement with the ratchet on the shaft, and the first stop plate is forced away from the ratchet, therefore the shaft can be turned by the handle counter-clockwise. When the switch is shifted to the middle position, the first stop plate and the second stop plate are respectively forced into engagement with the ratchet, and therefore the shaft can be turned by the handle in both ways. This structure of screwdriver is complicated. Furthermore, the switch tends to be shifted over the desired position during the adjustment of the control mode.

SUMMARY OF THE INVENTION

According to one aspect of the present invention, the ratchet transmission control mechanism comprises a casing having a head at one end, toothed shaft inserted into an axial center hole on the head to hold a bit for turning screws, two stop blocks mounted in a respective slot on the head of the casing and retained in place by a clamp for engagement with the toothed portion of the toothed shaft, an internally threaded adjusting cap mounted around the toothed shaft over the head of the casing and retained in place by an externally threaded locating ring, whereby when the adjusting cap is turned to the middle position, the two stop blocks are forced into engagement with the toothed portion of the shaft, for permitting the shaft to be turned by the casing in both ways; when the adjusting cap is turned to the leftward position or the rightward position, only one stop block is forced into engagement with the toothed portion of the shaft, and the shaft can only be turned by the casing in one direction. According to another aspect of the present invention, the head of the casing further comprises an axial blind hole at one end remote from the cylindrical body, a spring mounted inside the axial blind hole, and a locating rod having one end inserted into the axial blind hole and supported on the spring, and an opposite end projecting out of the head of the casing and inserted into a recess inside the adjusting cap. According to still another aspect of the present invention, a steel ball is removably mounted inside the axial center hole of the head of the casing to support the shaft. According to still another aspect of the present invention, the externally threaded locating ring has tool holes for turning by a tool, and therefore the externally threaded locating ring can be conveniently turned into engagement with the internally threaded adjusting cap.

DETAILED DESCRIPTION OF THE PREFERRED EMBODIMENT

Figure 1:
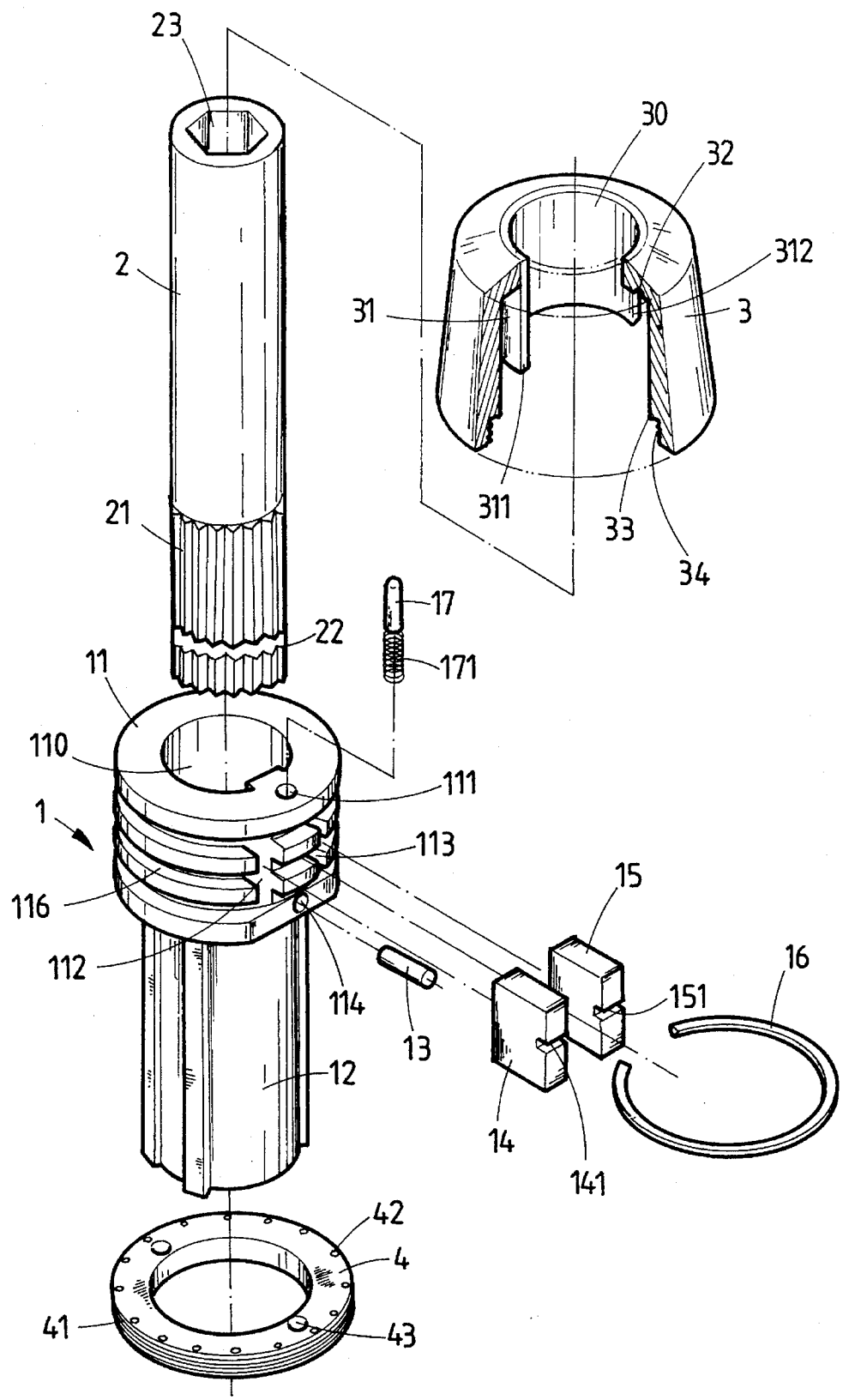
FIG. 1 is an exploded view of a ratchet transmission control mechanism according to the present invention.
Figure 2:
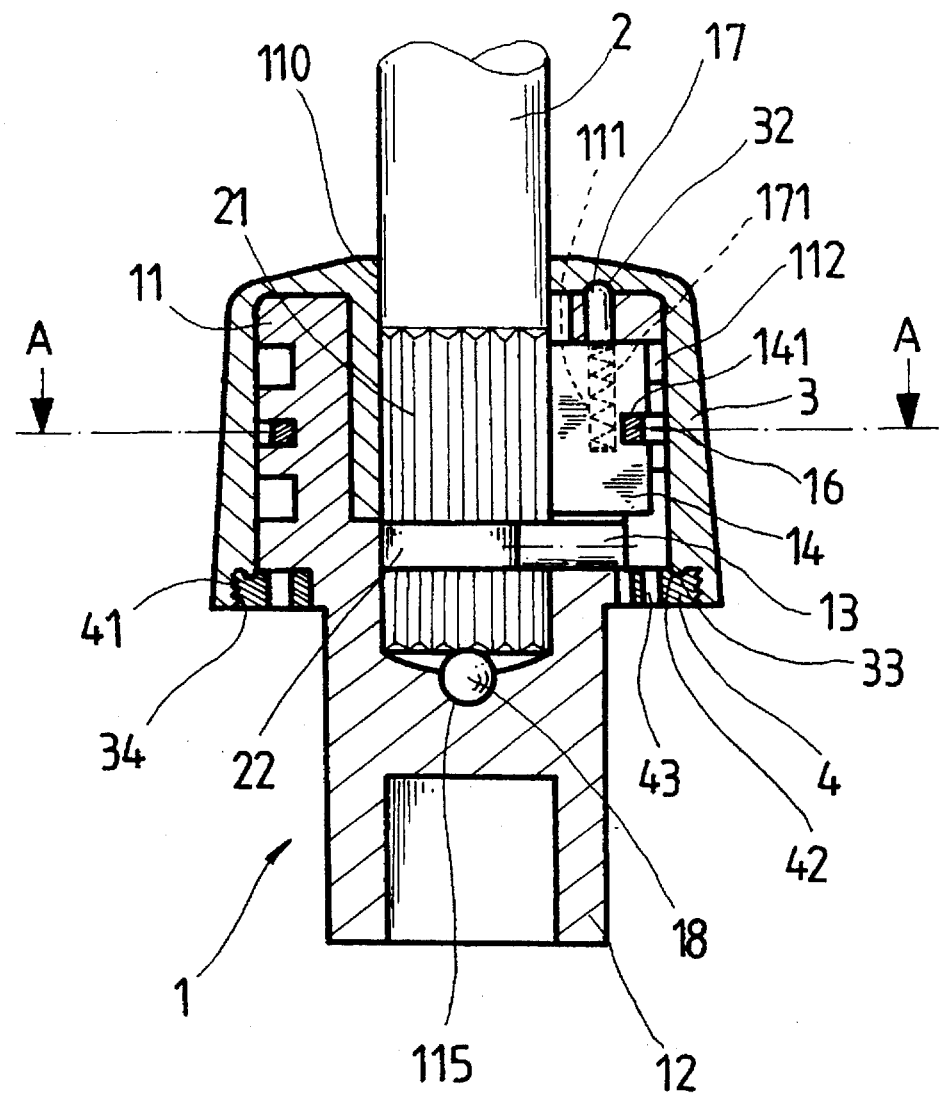
FIG. 2. is a sectional assembly view of the ratchet transmission control mechanism shown in FIG. 1.

Referring to FIGS. 1 and 2, a ratchet transmission control mechanism in accordance with the present invention is generally comprised of a cylindrical casing 1, a shaft 2, an adjusting cap 3, a locating ring 4, a left stop block 14, a right stop block 15, and a C-shaped clamp 16. The cylindrical casing 1 comprises a head 11 at one end, and a cylindrical body 12 at an opposite end. The head 11 of the cylindrical casing 1 comprises an axial center hole 110, a circularly recessed hole 115 at the center of the bottom of the axial center hole 110, a steel ball 18 revolvably mounted within the circularly recessed hole 115, a plurality of outside annular grooves 116 around the periphery at different elevations, a first side slot 112 and a second side slot 113 disposed in a parallel relation in communication with the axial center hole 110, a radial pin hole 114 in communication with the axial center hole 110, an axial blind hole 111 at one end remote from the cylindrical body 12, a spring 171 mounted inside the axial blind hole 111, and a locating rod 17 partially inserted into the axial blind hole 111 and supported on the spring 171. The shaft 2 comprises a toothed portion 21 at one end, an annular groove 22 around a part of the toothed portion 21, and a hexagonal coupling hole 23 for mounting a bit. When the toothed portion 21 is inserted into the axial center hole 110 of the head 11 of the casing I, the shaft 2 is stopped at the steel ball 18, and the annular groove 22 is disposed at the same elevation of the pin hole 114. A pin 13 is inserted into the pin hole 114 and engaged into the annular groove 22 of the shaft 2 to stop the shaft 2 from axial movement relative to the casing 1. The left stop block 14 is inserted into the first side slot 112 of the head 11 of the casing 1, having a mounting groove 141 at an outer end. The right stop block 15 is inserted into the second side slot 113 of the head 11 of the casing 1, having a mounting groove 151 at an outer end. The C-shaped clamp 16 is mounted in one outside annular groove 116 of the head 11 of the casing 1 and the mounting grooves 141 and 151 of the left stop block 14 and right stop block 15, to hold the left stop block 14 and the right stop block 15 into engagement with the toothed portion 21 of the shaft 2. Therefore, the shaft 2 is stopped from rotary motion relative to the casing 1. The adjusting cap 3 is mounted around the shaft 2 and covered over the head 11 of the casing 1, comprising a center through hole 30, which receives the shaft 2, an inside suspension flange 31 inserted into the axial center hole 110 of the head 11 of the casing 1 and having a left stop edge 311 and a right stop edge 312 at two opposite sides corresponding to the left stop block 14 and the right stop block 15, an inner thread 34 near the bottom end, an inside projecting portion 33 above the inner thread 34, and a plurality of inside recessed holes 32 for receiving one end (the top end) of the locating rod 17. The locating ring 4 is mounted around the cylindrical body 12 of the casing 1, comprising an outer thread 41 threaded into the inner thread 34 of the adjusting cap 3, a plurality of recessed portions 42 at the top side around the border for engagement with the inside projecting portion 33, and a plurality of toolholes 43 for turning by a tool. When the inside projecting portion 33 of the adjusting cap 3 is forced into on recessed portion 42 of the locating ring 4, a click sound is produced to index the positioning.

Figure 3:
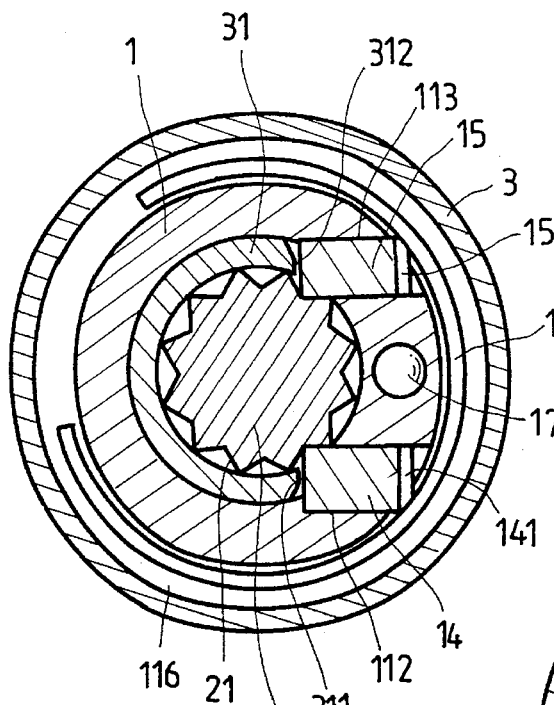
FIG. 3 is a sectional view along line A—A of FIG. 2.

Referring to FIG. 3, when the adjusting cap 3 is turned to such a position (the middle position) that the first stop block 14 and the left stop block 15 are respectively disconnected from the left stop edge 311 and the right stop edge 312, the first stop block 14 and the left stop block 15 are respectively forced into engagement with the toothed portion 21 of the shaft 2 by the C-shaped clamp 16, and therefore the shaft 2 can be turned by casing 1 leftwards or rightwards.

Figure 4:
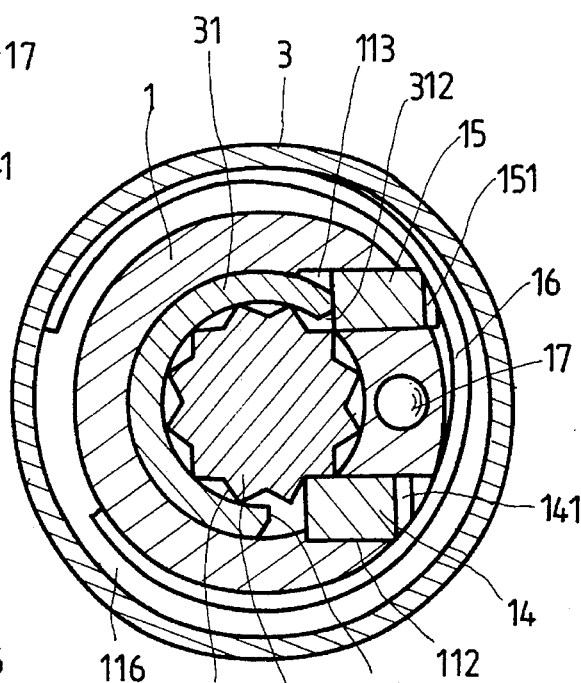
FIG. 4 is similar to FIG. 3 but showing the left stop block engaged with the toothed portion of the shaft, and the right stop block disengaged from the toothed portion of shaft.

Referring to FIG. 4, when the adjusting cap 3 is turned in one direction (clockwise), the right stop block 15 is forced away from the toothed portion 21 of the shaft 2 by the right stop edge 312, however the left stop block 14 is still maintained engaged with the toothed portion 21 of the shaft 2, and therefore the shaft 2 can be turned in the counter-clockwise direction by the casing 1, but the casing 1 will run idle if it is turned in the clockwise direction.

Figure 5:
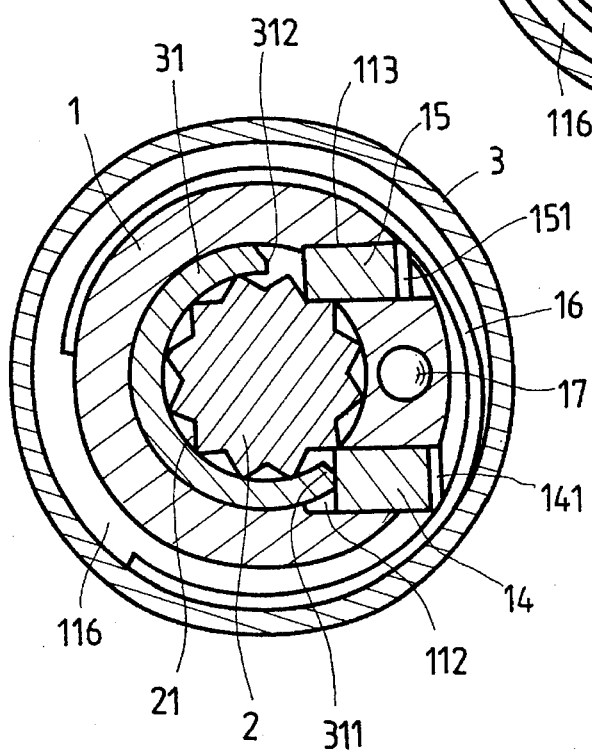
FIG. 5 is similar to FIG. 3 but showing the right stop block engaged with the toothed portion of the shaft, and the left stop block disengaged from the toothed portion of the shaft.

Referring to FIG. 5, when the adjusting cap 3 is turned in the reversed direction (counter-clockwise), the left stop block 14 is forced away from the toothed portion 21 of the shaft 2 by the left stop edge 311, however the right stop block 15 is still maintained engaged with the toothed portion 21 of the shaft 2, and therefore the shaft 2 can be turned in the clockwise direction by the casing 1, but the casing 1 will run idle if it is turned in the counter-clockwise direction.

I claim:

1. A ratchet transmission control mechanism comprising:

a cylindrical casing having a head at one end and a cylindrical body at an opposite end, said head comprising an axial center hole, a circularly recessed hole inside said axial center hole, a steel ball revolvably mounted within said circularly recessed hole, at least one outside annular groove around the periphery, a first side slot and a second side slot disposed in a parallel relation in communication with said axial center hole, a radial pin hole in communication with said axial center hole;

a shaft having a hexagonal socket at one end for mounting a bit, a toothed portion at one end inserted into the axial center hole of the head of said casing and supported on said steel ball, and an annular groove around a part of said toothed portion;

a pin inserted into the pin hole of the head of said casing and engaging the annular groove of said shaft to stop said shaft from axial movement relative to said casing;

a left stop block inserted into the first side slot of the head of said casing;

a right stop block inserted into the second side slot of the head of said casing;

a C-shaped clamp mounted in one outside annular groove of the head of said casing to hold said left stop block and said right stop block in said first side slot and said second side slot respectively;

an adjusting cap mounted around said shaft and covered over the head of said casing, said adjusting cap comprising a center through hole, which receives said shaft, an inside suspension flange inserted into the axial center hole of the head of said casing, said inside suspension flange having a left stop edge and a right stop edge at two opposite sides corresponding to said left stop block and said right stop block, and an inner thread, an inside projecting portion; and a locating ring mounted around the cylindrical body of said casing to hold said adjusting cap in place, said locating ring comprising an outer thread threaded into the inner thread of said adjusting cap, a plurality of recessed portions at a top side thereof for engagement with the inside projecting portion of said adjusting cap for indexing the positioning of said adjusting cap by producing a sound upon the engagement of the inside projecting portion of said adjusting cap with one recessed portion;

wherein said shaft can be turned by said casing clockwise as well as counter-clockwise, when said adjusting cap is turned relative to the head of said casing to a first position to disconnect said left stop edge and said right stop edge, for permitting said left stop block and said right stop block to be forced into engagement with the toothed portion of said shaft by said C-shaped clamp; said shaft can be turned counter-clockwise by said casing and will not be turned clockwise upon a clockwise rotation of said casing, when said adjusting cap is turned relative to the head of said casing to a second position to force said right stop block away from the toothed portion of said shaft by said right stop edge, and to let said left stop block be maintained engaged with the toothed portion of said shaft; said shaft can be turned clockwise by said casing and will not be turned counter-clockwise upon a counter-clockwise rotation of said casing, when said adjusting cap is turned relative to the head of said casing to a third position to force said left stop block away from the toothed portion of said shaft by said left stop edge, and to let said right stop block be maintained engaged with the toothed portion of said shaft.

2. The ratchet transmission control mechanism of claim 1 wherein the head of said casing further comprises an axial blind hole at one end remote from said cylindrical body, a spring mounted inside said axial blind hole, and a locating rod having one end inserted into said axial blind hole and supported on said spring, and an opposite end projecting out of the head of said casing and inserted into a recess inside said adjusting cap.

3. The ratchet transmission control mechanism of claim 1 wherein said locating ring has a plurality of tool holes for turning by a tool.

\* \* \* \* \*